(12) United States Patent  
Krupnick et al.

(10) Patent No.: US 8,310,529 B2  
(45) Date of Patent: Nov. 13, 2012

(54) SYSTEM AND METHOD FOR AUTOMATIC PROCESSING OF ENDOSCOPIC IMAGES

(75) Inventors: Michael Ian Krupnick, Whitehall, PA (US); Michael Pietromonaco, New Hyde Park, NY (US); Steven Gerard Sanderson, Lawrenceville, PA (US); Makoto Watai, Northport, NY (US); Atsushi Amano, Huntington, NY (US); Koichi Hirose, East Northport, NY (US)

(73) Assignee: Olympus Medical Systems Corp., Tokyo (JP)

( * ) Notice: Subject to any disclaimer, the term of this patent is extended or adjusted under 35 U.S.C. 154(b) by 1449 days.

(21) Appl. No.: 11/434,098

(22) Filed: May 15, 2006

(65) Prior Publication Data

US 2007/0273759 A1   Nov. 29, 2007

(51) Int. Cl.  
*A62B 1/04*   (2006.01)
(52) U.S. Cl. .................................................... 348/65
(58) Field of Classification Search ............... 348/65  
See application file for complete search history.

(56) References Cited

U.S. PATENT DOCUMENTS

2003/0025830 A1* 2/2003 Perry ........................... 348/441  
2004/0243448 A1* 12/2004 Shoji et al. ....................... 705/3

* cited by examiner

*Primary Examiner* — Jay Patel  
*Assistant Examiner* — Richard Torrente  
(74) *Attorney, Agent, or Firm* — Scully, Scott, Murphy & Presser, P.C.

(57) ABSTRACT

A system and method for automatically configuring a display device for an endoscopic procedure. The system includes: a video processing device for receiving image signals of an object from an endoscope device. A first converting device converts the image signals provided by a standard definition endoscope device into first resolution video image signals for display on a display device; or, converts image signals provided by a high definition endoscope device into second higher resolution video image signals for display. A second converting device converts the second higher resolution video image signals into first resolution video image signals image signals. A processing node receives: the first resolution video image signals from either the first converter means, or from the second converter means. An image capture means at the processing node captures still images of the first resolution video image signals received. The processing node further routes back to the video processing device the first resolution video image signals from the image capture card. A switching device receives the first resolution video image signals from the image capture card and routes the first resolution video image signals to the first display device or, alternately, receives the video image signals from the first converting means for routing to the first display device.

25 Claims, 8 Drawing Sheets

SYSTEM AND METHOD FOR AUTOMATIC PROCESSING OF ENDOSCOPIC IMAGES

BACKGROUND OF THE INVENTION

1. Field of the Invention

The present invention relates generally to imaging systems and workstations for medical applications, and particularly the generation, processing and displaying of endoscopic images on a display device, e.g., a television monitor, during an examination.

2. Discussion of the Prior Art

There currently exists a clinical information management system known as Endoworks (hereinafter "EW system" manufactured by Olympus America, Inc.) that provides functionality for automating the endoscopy lab by managing patient examination data at different phases of patient care.

Particularly, the EW system, designed for the practice of endoscopy, is a comprehensive, real-time, interactive clinical information management system with integrated reporting features, that manages and organizes clinical information, endoscopic images and related patient data, at various levels of detail, for creating efficiencies and facilitating functions performed by users of endoscopic equipment, e.g., physicians, nurses, clinicians, etc.

Figure 1:
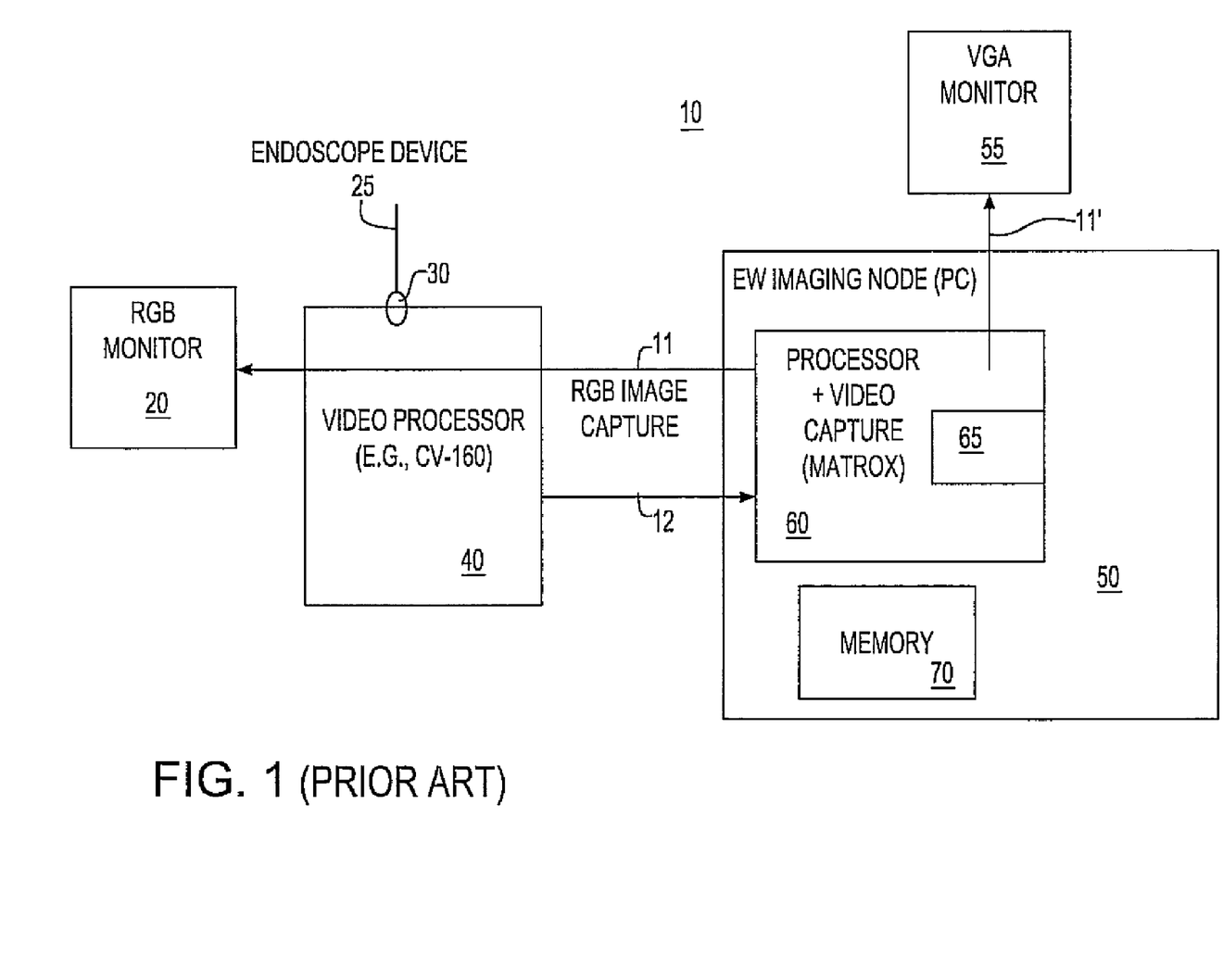
FIG. 1 is a block diagram depicting the endoscopy lab 10 for generating, processing and displaying of real-time endoscopic images according to current technology.

As shown in FIG. 1, integral to the performance of an endoscopy procedure is the real-time presentation of endoscopic images and related examination data (e.g., patient ID, practitioner information, endoscope ID type). Typically, endoscopic image signals of an examined subject are obtained from a solid state (e.g., charge coupled devices, CCD) imager device provided with the scope device 25. The generated output scope image signals are input to a video processor device 40 where the scope (CCD imager output) signals are converted by a converter means (not shown) to a video signal, e.g., according to NTSC, PAL or like color image display formats, for display and real-time viewing on an RGB display device 20, e.g., a television monitor.

In a particular implementation of the EW system, as shown in FIG. 1, video image signals output of a video processor device 40 receiving live endoscopic images are processed and communicated to an EW imaging workstation 50 (imaging "node") where the video image signals are captured and further displayed in a separate monitor, e.g., imaging workstation display such as a VGA graphics monitor 55, which may be a scaled version of the RGB monitor with aspect ratio preserved, and providing an image capture screen. As will be explained in greater detail herein, upon initiation by the practitioner, the video image signals may be captured, processed (digitized) and stored in a memory at the imaging node. Not only are still images available for capture, but live moving image clips are further capable of being captured and stored in an EW system memory or server storage device (not shown). The EW system imaging node 50 particularly implements image management functionality enabling a user to annotate, label, import, export, and enhance the quality of images, including the ability to manage, record, store and export live video clips. It is understood that every image/image clip captured are associated (i.e., linked) with the particular patient and examination and capable of being accessed according to entry of a key, e.g., the patient's name.

As further shown in FIG. 1, there is provided a block diagram depicting the endoscopy system 10 for generating, processing and displaying of real-time endoscopic images. The system comprises an endoscope device 25 connected via a connector device 30 to the video processor device 40, for example, an Olympus CV-160 device. As mentioned the endoscopic device includes a solid state CCD imager for generating real-time frame image signals, eg., simultaneously generated RGB signals, which are processed by the video processor device to generate real-time video signals of the image for display on an RGB monitor 20. As shown the video processor is further connected via a communications interface (not shown), to the EW imaging node 50 comprising, for example, a personal computer (PC) or workstation 50, including a processor 60, a video frame capture board 65 for capturing the real-time video image signals 12 and digitizing the image, and, a memory 70 device for storing the captured, digitized image, and including a video display driver element for further displaying a whole or scaled version of the image, for example, on a second monitor, e.g., VGA monitor device 55. In one embodiment, the processor implemented at the imaging node 50 includes a Matrox Orion (available from Matrox Imaging Group) which is a frame grabber board that captures standard analog composite, RGB and Y/C video in NTSC/PAL formats from the video processor 40. The captured field are stored in the memory 70 of the imaging node. A graphics controller (not shown) provided with the Matrox board is provided for handling VGA display output and includes a graphics overlay and video scaling.

More particularly, the image capture board is further capable of capturing images from any of the following video input signal sources: Standard NTSC (or optional PAL) composite, component RGB or Y/C video (optional depending on model). The board is capable of receiving and processing (e.g., digitizing) Standard Definition (SD), for example, at a resolution of 768 pixels by 576 lines in size (from a full PAL frame; a full NTSC frame is 640 pixels by 480 lines), and at a color depth of 8 bits for each of the RGB components. There is sufficient capability to capture full screen images. The board is further able to provide output of both RGB and NTSC composite interlaced video signal 11 back to the video processor 40 for display on the RGB monitor 20; however, PAL-compatible output are also supported. The board 65 is further capable of providing an image signal 11'. As described in greater detail herein, to support the overlay of graphics information (including text such as patient information data) on the video input signal 12, the capture board 60 is capable of masking out any desired portion of the video input signal. The image capture board additionally permits the simultaneous connection of multiple video input signal types (such as RGB and composite) and be able to switch between them under software control.

In a current embodiment of the EW system 10, communications are handled between a video processing device, e.g., CV-160 available from Olympus Medical Systems Corp., and other legacy processors. All processors currently are configured for handling Standard Definition (SD) images. Within the current configuration of the EW system, the CV-160 video processing device and other legacy processors forward SD images to the EW systems processor device.

For future implementations it is contemplated that state-of-the-art current imager devices providing High Definition (HD) image signals be implemented.

However, as the current EW system implementations only handle SD images, i.e., a Standard Definition signal must be displayed on the RGB display Monitor 20 when in a typical operating mode due to the inability of the Matrox Orion image capture card to capture and process HD image signals, a more versatile solution is desirable.

It would thus be highly desirable to provide a system patch that would enable the system to continually display HD signal images on the RGB HDTV monitor during typical operating modes for an endoscopic or like medical procedure, notwithstanding the fact that the current image capture card is unable to capture HD image signals.

SUMMARY OF THE INVENTION

Accordingly, it is an object of the present invention to provide a novel system and method for generating, processing and displaying High-Definition (HD) endoscopic images on a monitor device.

In a first aspect of the invention, there is provided an endoscopic image display apparatus, method and computer program product, the apparatus comprising:

a video processing device adapted for receiving image signals from an attached endoscope device having an imaging device for generating image signals of an object during an endoscopic examination, an attached standard definition endoscope device into first resolution video image signals; or, converting said image signals provided by an attached high definition endoscope device into second higher resolution video image signals; and, a second converting means for converting said second higher resolution video image signals into first resolution video image signals image signals;

a processing node for receiving one of: said first resolution video image signals from said first converter means, or said first resolution video image signals from said second converter means, said processing node including image capture means adapted for capturing still images of said first resolution video image signals from said first converter means or said second converter means and, further routing back to said video processing device said first resolution video image signals from said processing node;

a switch means provided in said video processing device and configured for receiving said first resolution video image signals from said processing node and for routing said first resolution video image signals from said processing node to a first display device or, alternately, receiving one of said first resolution video image signals from said first converting means or said second higher resolution video image signals from said first converting means for routing respective said first resolution video image signals or second higher resolution video image signals to a first display device; and, said first display device coupled with said video processing device for real time viewing of said first resolution video image signals or second higher resolution video image signals from said first converting means or, said first resolution video image signals from said-processing node.

In accordance with this aspect of the invention, the system and method for automatically configuring a display system for an endoscopic procedure includes features including, but are not limited to:

the ability to import image data in a PC card (memory) from video processing device to the EW image processing node;

the ability to quickly detect endoscope change from standard definition (SD) scope to High definition (HD) scope, and vice versa, and generating a command, by the video processing device, for receipt by the processing node that the input image signal from the video processor has changed;

the ability to detect a unique endoscope implemented for a procedure by using not only the scope's serial number but also scope type;

the ability to format, including truncating information such as patient name/ID, and transmitting these truncated information and other optional information to the video processor;

the ability to format information such as patient name/ID by implementing function for setting the truncation length due to the length of patient name/ID managed by the processing node system being different than data lengths managed in the video processor;

the ability to change operating mode of the video processor format from a Digital File (DF) mode of operation to a Scope mode of operation in order to show real size live image when user changes use from Standard Definition (SD) scope to a high definition (HD) scope and the capture card in the processing node can not process HD image signals. Thus, even if a user uses "DF mode" of the video processor and the EW node capture card can not handle an HD image, the user can still watch HD live image on RGB monitor;

the ability to prevent or remove patient data information on the RGB display monitor of video processor by sending an appropriate command signal from the EW node to the video processor during release sequence when in a Scope mode of operation;

because the user can always watch a live image handled by the video processing device on the first display device (e.g., RGB monitor), the system removes information on live image from the video processor in response to a received command in order to capture images without the information;

the ability to enable a user to always watch live image on the display monitor in a "Scope mode" of video processing operation, including the ability to remove any overlayed patient data on the live image during an image capture sequence;

the ability to display a message which image signal EW is currently handling by sending command to video processor in case of 'Scope mode' when EW is handling image signal except for video processor.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT

Figure 2A:
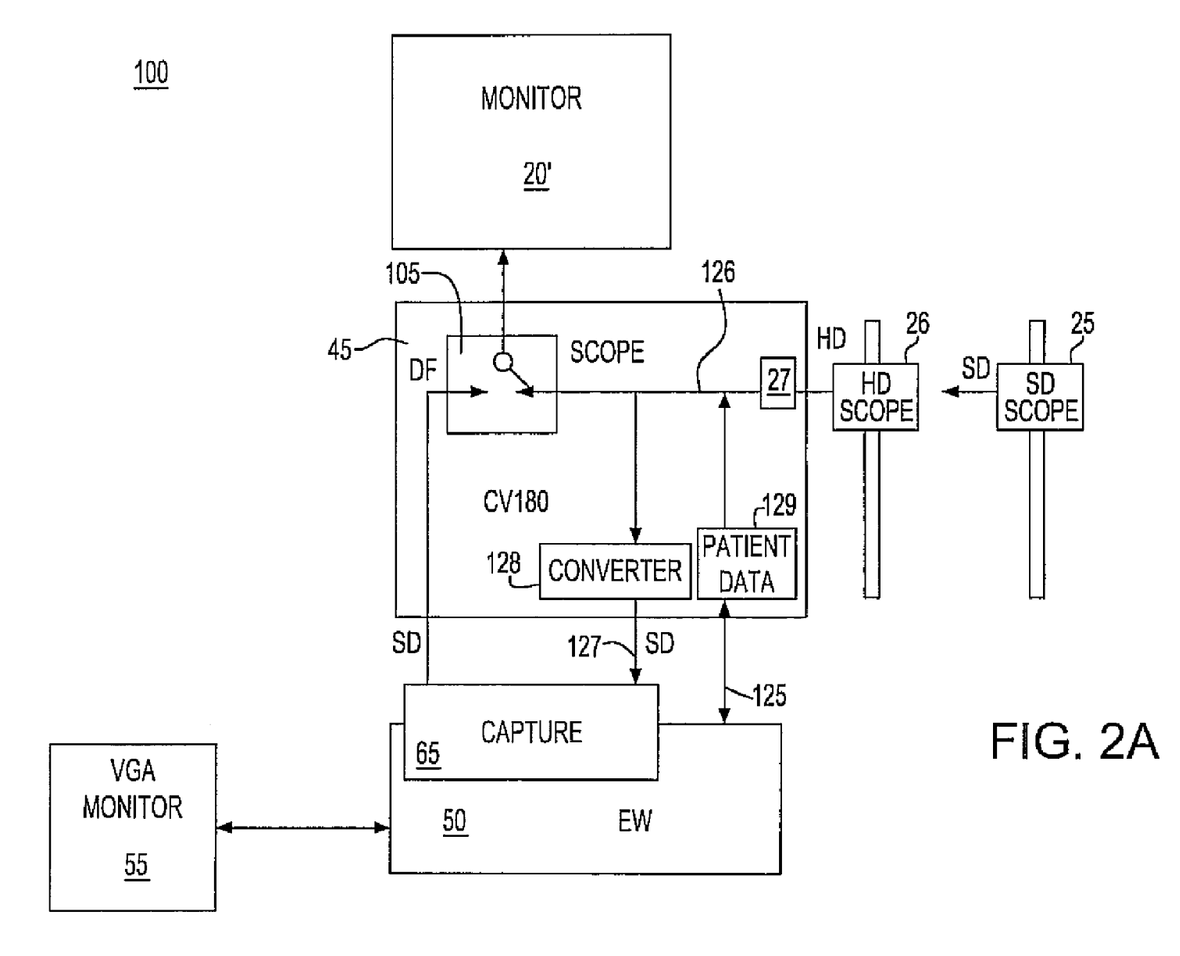
FIGS. 2A and 2B are schematic block diagrams depicting the endoscopy lab 100 for generating, processing and displaying of real-time High-Definition or Standard-Definition endoscopic video image signals in a "Scope" mode of operation (FIG. 2A) and, displaying Standard-Definition endoscopic video image signals in a Digital File ("DF") (FIG. 2B) mode of operation according to the invention.

In a particular implementation of the EW system 100 according to the improvements of the present invention, as shown in FIG. 2A, there is provided a signal bypass solution provided in the video processor that enables a High Definition (HD) signal from an endoscope 26 to bypass the image capture card provided at the EW system node and instead, is routed directly to the RGB (HD) Monitor via the processors scope mode. In the invention, a high definition (HD) signal and Standard Definition (SD) signal represents respective HDTV and SDTV that is defined according to the SMPTE standard Particularly, as shown in FIG. 2A, the video processor, e.g., a CV-180 available from Olympus Medical Systems Corp., is provided with an image source switch 105 for switching the source of the endoscopic image output signal to a monitor between scope and the EW node. It is understood that the monitor can accept any type of the video signal including SD an HD. The purpose of the switching is not for adjusting signal format for monitor but, what shall be displayed with the high resolution image or what shall be displayed with the low resolution image. In the exemplary embodiment described, the endoscopic image signal source is switched by software control or by, manual; hardware control. In one switch configuration (SCOPE operating mode) shown in FIG. 2A, a live image signal is provided from a CCD imager device in the attached HD scope 26 that is converted by converting device 27 into HD video image signals 126. Similarly, in SCOPE operating mode, a live image signal may be provided from a CCD imager device in an attached SD scope 25 that is converted by converting device 27 into SD video image signals. In a second switch configuration (Digital File or DF operating mode) shown in FIG. 2B, an image signal is provided from an SD image signal source, and particularly, provided from the EW system that performs standard definition (SD) signal endoscopic image signal capture, that is viewable from the monitor device.

In one implementation, the video processor device 45 may include an image capture device (not shown), a memory storage device (e.g., any device accessible embedded or removable data storage media) (not shown), and may implement an image capture feature, such that, an HD endoscopic image signal may be captured by the video processor device for storage in and later retrieval from memory storage. Further to this feature, patient ID and other types of data (e.g., type of procedure performed, image number) may be sent to the video processor from the EW system node via a data line (e.g., RS 232 link, Ethernet, USB, IEEE 1394, etc.) 125. This patient and other data 129 is overlayed onto the image signal when viewed on the monitor 20'. Further to this implementation, any captured images stored in PC card for Video Processor may be subsequently imported to the EW system node via PC card reader device connected with the EW system node (not shown). In still a further implementation, in either a first switch configuration (SCOPE mode as in FIG. 2A) or second switch configuration (Digital File mode as in FIG. 2B), the EW system node performs the image capture. However, in such embodiment where an HD-type scope 26 is attached, the HD video image signal 126 is first converted to an SD video image signal 127 by second converter device 128 and the SD image data transmitted to the image capture board at the image node 50 for SD image capture. It is further understood that, in this embodiment, a live HD image may still be continuously displayed on monitor 20' even if EW system node uses video capture card, which can't handle the HD image signal.

With respect to the feature of importing captured images saved to a PC card (e.g., memory) on the video processor device itself, into the EW system node 50, this is accomplished in a similar manor to ICU synchronization via a PC card reader connected to the PC. When an EW system node client is started, the system checks for a PC card automatically. If a PC card is detected, and the PC card has image data captured by the Video Processor, an Import Pop-Up message shall appear (at the EW system node VGA monitor (or any suitable EW system node (PC) display)). The ICU Synchronization screen has a button "PC Card Import". When this button is selected, the EW system searches for the PC card. The Import Pop-Up message includes the filter criteria from which the EW system shall search data into ICU Synchronization. There may be three radio selections presented for user selection: 1) Single Day—which enables the user to search exams (images captured) from a single day. This may be a default selection. There is also included a single date field which shall default with the current date and, a calendar icon next to the date field that shall pop-up the calendar for date selection; 2) Date Range—which enables the user to search exams between a date range provided for entry by a user via two date fields "From" and "To" (not shown). Each field shall have a calendar icon next to it for pop-up of the calendar for date selection, e.g., enabled to search exams with dates >=From and<=To; and 3) All—This shall search all exams from the PC card. When one radio selection is selected, the other fields and calendar icons are grayed out until their radio button is selected. There are 'Ok' and 'Cancel' buttons presented for user selection as well: 'Cancel' will effect closing the window and returning to the previous state prior to selecting the "PC Card Import" button; 'OK' will enable importing exams based on the radio selection and the date entries, close the search window, and refresh the ICU synchronization page.

The user will then associate a selected exam from the PC card with an EW exam manually.

Referring back to FIG. 2B, in the alternate switch setting, the image source switch 105 switches the SD video image signal from the capture board at the EW system node 50 back to the RGB monitor 20' for displaying the SD endoscopic signal in a Digital file (DF) mode. Thus, in a DF mode of operation (Digital File mode), an SD image signal 127, whether provided initially by converter device 128 from an attached HD scope 26, or input via an attached SD scope 25, will be input to the image capture board at the EW system (image) node 50 for SD image capture. However, in this embodiment, an SD image is displayed on monitor 20'.

Thus, it is understood that the imaging node workstation 50 is adapted to drive both the RGB monitor display 20' as well as the node's VGA display 55, through the driver element of the Matrox Orion image (frame) capture board 65 in the imaging workstation or PC 50. Integral to the embodiment of the invention, is the automatic recognition ability of the CCD type, i.e., the scope types. That is, communication between the imaging node 50 and the video processor device 45 is provided, whereby processing in the node interrogates the video processor to determine the type of scope or video chip being used. For example, according to one embodiment, the EW imaging node 50 software will obtain the Scope Chip information associated with endoscope device via communication with the video processor including the Model, Serial number, Scope ID, Channel size, and repair information.

As mentioned in connection with FIG. 2A, the image source switch 105 is activated to the SCOPE mode from the EW system by using a remote command automatically in case of "Auto-mode" operational -mode. Preferably, as shown in FIG. 2A, the HD signal 126 is input to the video processor 45 sourced from HD scope 26 and converter 27. If the HD scope 26 is connected, the EW node sends an appropriate command to Video Processor in order for user to show patient information on RGB monitor 20', however, this information is removed by the video processor device while the EW system node is capturing an image. It is understood that the length of patient data is not enough and is addressed as described in greater detail hereinbelow.

Additionally, a message such as "#1 captured" is able to be shown via the monitor 20' after capturing the image. Additionally, data such as the Exam type, physician name and some other text-based data is able to be shown via the display monitor 20'. Via the converter device 128 provided in the video processor device, the HD signal is able to be converted to an SD signal (RGB), in order for EW to capture image.

Figure 2B:
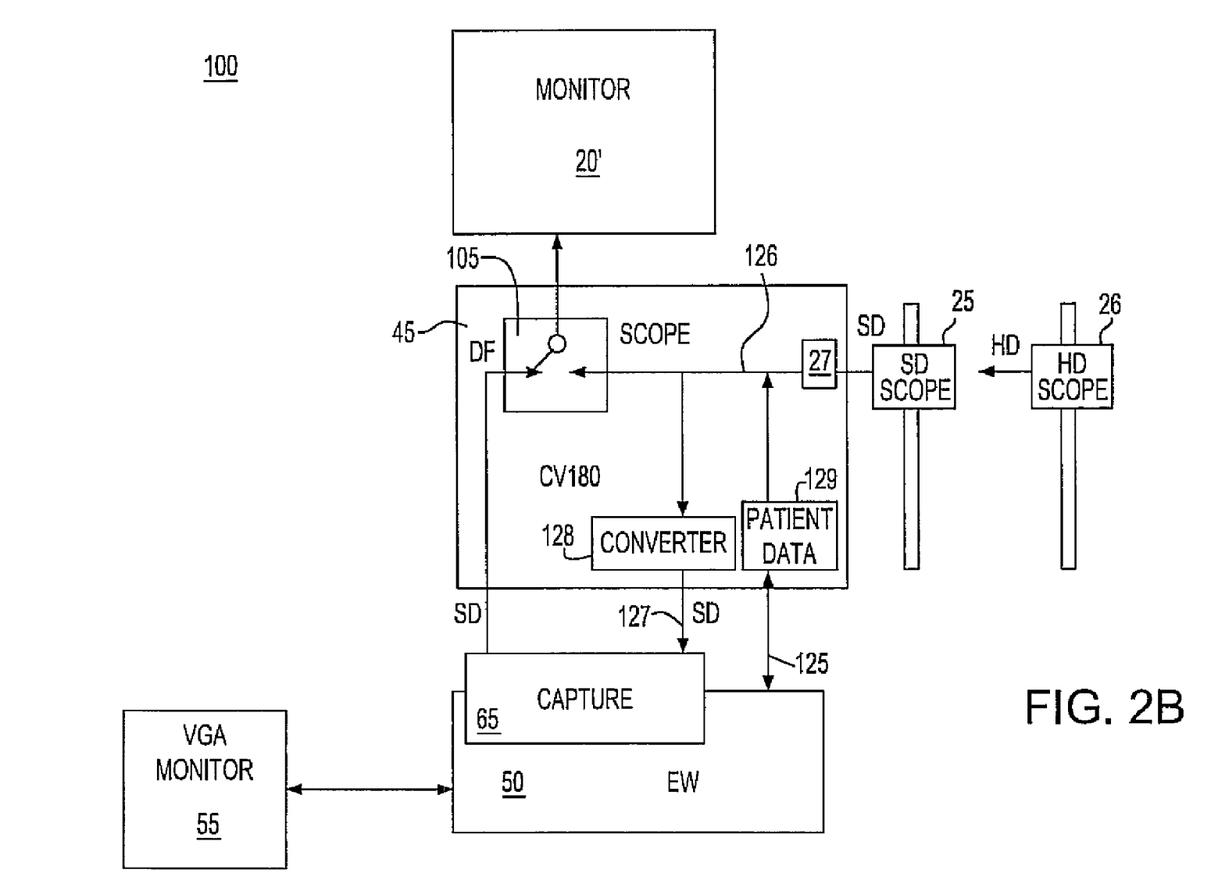

Consequently, due to the additional switching image source functionality, the video processor device (e.g., Olympus CV-180) is programmed with additional software functionality. The first software enhancement is providing the ability to send the exact patient data to the CV-180 for display. The second software enhancement is made to the release sequence. The third software enhancement is administrative in nature. With more particularity, users have the option of choosing an "Image Capture Default Mode" setting with choices of "Scope Mode Standard" and "Auto-Mode". "Scope Mode Standard" is defined as the video processor device always configured for processing in SCOPE mode for all connected scopes (image source switch 105 activated to Scope). In an "Auto-Mode" configuration, which may be configured as a default setting, the Video Processor device operates in Scope mode only for HD scopes, and in Digital File (DF) mode for all other scopes. The user has the option of selecting for each node in a "Node Settings" page of administration configuration (not shown) with a drop down box called "Image Capture Default Mode" having two pull down box menu options: "Scope Mode Standard" and "Auto-Mode". Thus, for example, when a "Scope Mode" configuration is selected, certain commands will be different than the standard command sequence. For instance, a remote command is not sent to the video processor. Rather a remote command having a changed parameter field indicating "Exchanging display to the Scope" is sent (rather than the "Exchanging display to DF" parameter field indication). Even when "Scope Mode Standard" is selected, when Digital File operating mode is selected via the video processor front panel (not shown), live SD images shall be provided by the EW system (SD signal 127 as shown in FIGS. 2A, 2B)) and SD images will be able to be captured whether in DF or Scope mode. Furthermore, the image on the computer monitor is not HD and the videos/images captured will not be HD.

As described hereinabove, as shown in FIGS. 2A and 2B, in current embodiments of the EW system, the EW node 50 transmits dummy patient information 125 to the video processor device because the current EW system node just uses 'DF mode' only. As the video processor has to display real information during the procedure, the real information must be communicated to the video processor.

Preferably, these changes will be applied during video processor initialization. When transmitting patient data to the video processor device during initialization, the following information and requirements are implemented:

Patient ID—the exact patient ID (e.g., "IDCIMS2004072601") is sent to the video processor; in one embodiment, the maximum number of Patient ID characters that can be displayed on the monitor 20' is 15 characters. If the patient ID data is greater than the limit of characters, e.g., 15 characters, patient data characters are truncated as is shown displayed in field 179 via the RGB monitor display 175 as shown in FIG. 4.

Patient Name—the exact patient name is sent to the video processor; In one embodiment, the maximum number of Patient Name characters that can be displayed on the monitor 20' is 20 characters. If the patient Name data is greater than the limit of characters, e.g., 20 characters, patient name characters are truncated as is shown displayed in field 182 via the RGB monitor display 175 as shown in FIG. 4.

Figure 4:
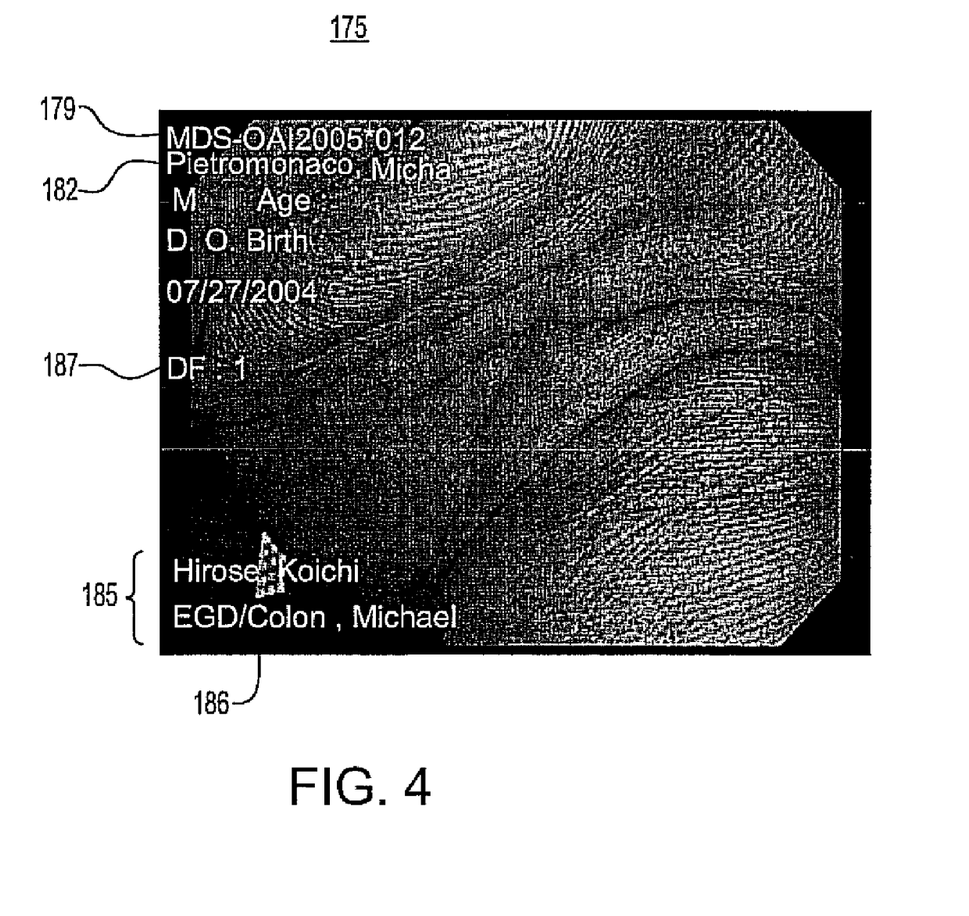
FIG. 4 depicts an exemplary screen display 175 providing results of an applied truncate process if the patient ID data is greater than the limit of characters.

Exam Type—the exact Exam Type information is sent to the comment field 185 as is shown displayed via the RGB monitor display 175 as shown in FIG. 4.

Image Number—the exact Image Number 187 of the latest image captured is sent to the processor as is shown displayed via the RGB monitor display 175 as shown in FIG. 4.

In greater detail, as mentioned, with respect to the truncation of the patient ID as performed by the EW of the present invention, the Patient ID (ID) field can only handle 15 characters displayed on the screen. Any Patient ID's greater than 15 characters must be truncated and the EW system 50 provides such a truncation function for display purposes only and will not affect the stored patient information. If the Patient ID is=<15 then it is not necessary to truncate prior to sending the ID command to the processor. As shown in the exemplary screen display 130 of FIG. 3, the truncation function provides users with the option of setting up, in a "Facility Settings" initialization routine, how the patient ID is to be truncated when displayed. The routine causes for display a certain number of Front characters, then a star "*" character is inserted, then a certain number of end characters. If the user wishes to merely truncate the end, they can set front to 14. If the user wishes to merely truncate the beginning, they can set the Front to 0. Default value for this variable is Front=14.

Figure 3:
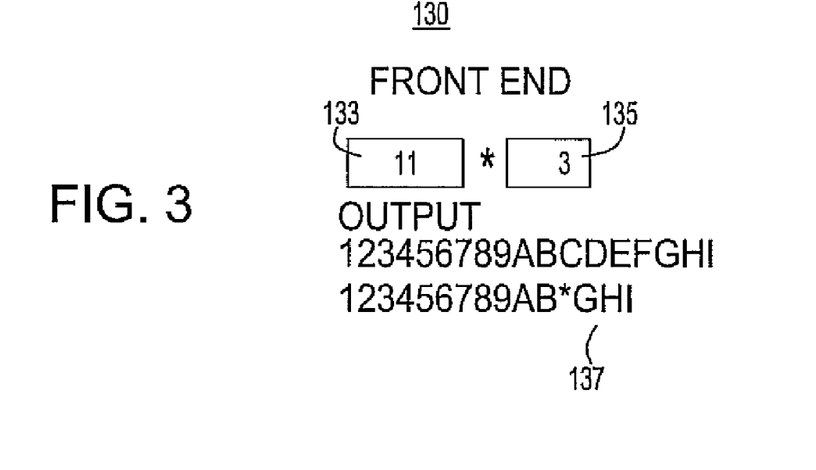
FIG. 3 depicts an exemplary screen display 130 enabling provision of a truncation function that provides users with the option of setting up, how the patient ID is to be truncated when displayed via displayed data entry fields.

As shown in the exemplary display 130 illustrated in FIG. 3, when the user enters a value in the "Front" numeric entry field 133, this dynamically updates the "End" field 135 and the "Output" field 137; when the user leaves the "Front" numeric entry field (tabs or clicks elsewhere on the screen). If the value entered at this time in "Front" numeric entry field 133 is not a number or, is not between 0-14, then the user must be notified. In this case, the "End" output display is updated to display "ERR" and the "Output" Display is updated to display the text string "Value entered in the Front field must beta number between 0 and 14." When the user attempts to save with a number outside the range of 0-14, a pop-up will be displayed informing the user to "Enter a number between 0-14 in the Patient ID Truncation Front Field."

Thus, for example, given an example formatted Patient ID field having front numeric entry field 133 with a value of 11, and an end numeric field entry 3 as a user-configured display format, the numeric field entry 15, for an EW system Patient ID of 123456789ABCDEFG-, truncation performed by the present invention will display the Truncated Patient ID as 123456789AB*GHI (Front: 0-14; End is calculated as (14—Front).

Figure 5:
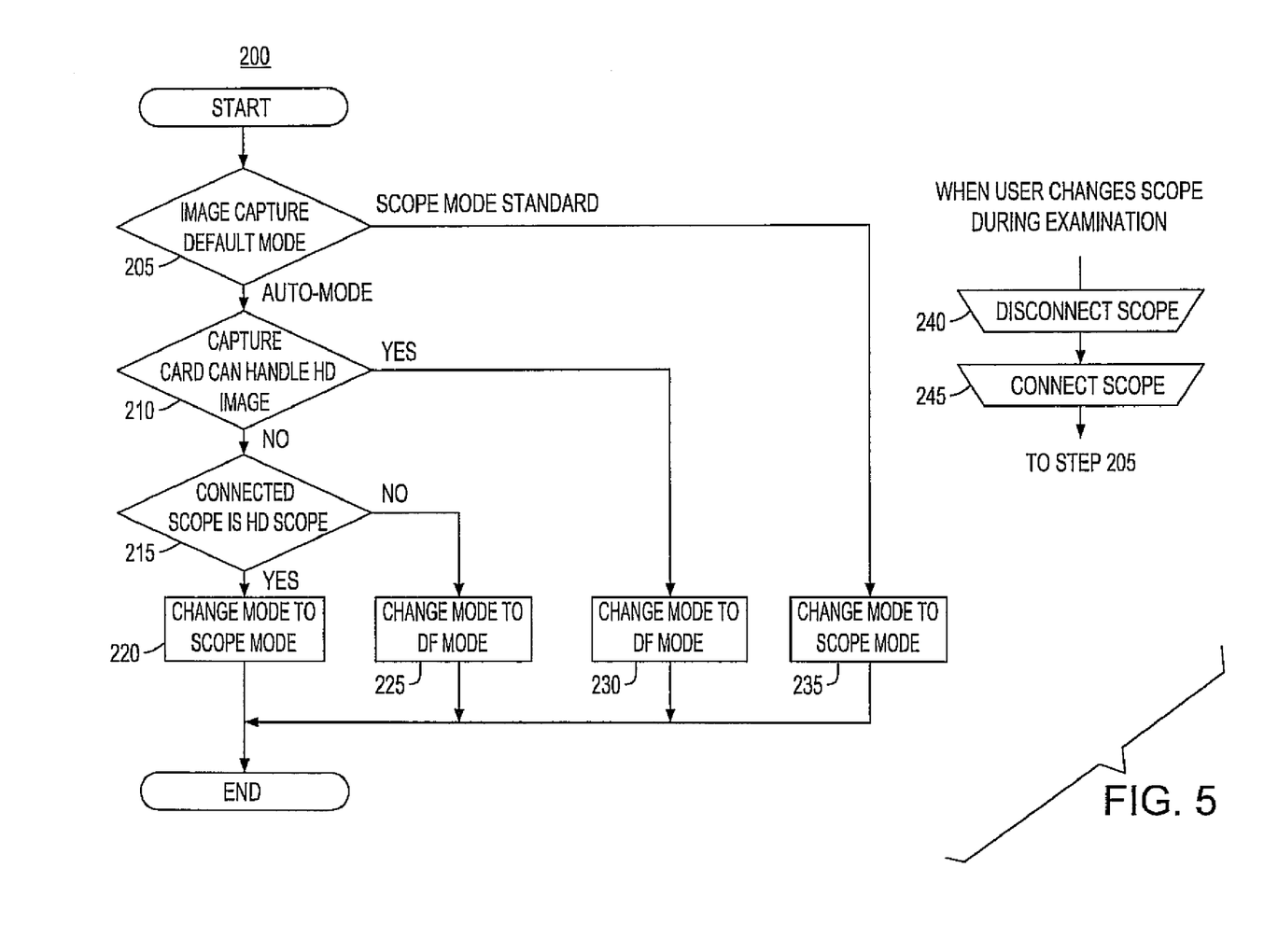
FIG. 5 is a flow chart depicting a process implemented by the EW processing node when changing between "Scope mode" and "DF mode" and from "DF mode" to "Scope mode" in order to show real resolution live image when changed.

In greater detail, as mentioned, with respect to the truncation of the patient name as performed by the EW of the present invention, the Patient Name field can only handle a maximum of 20 characters on the monitor. Patient names greater than or equal to 19 characters are truncated when displayed on the monitor. Patient names less than 19 characters do not need to be truncated as shown in the Table 1.

when a user changes scope during an endopscopic examination by disconnecting a scope (e.g., SD scope) as shown at step 240 in FIG. 5 and connecting a new endoscope (e.g., HD scope) at step 245. As shown at a first step 205, a determination is first made as to whether the display system is in an Image Capture Default Mode (i.e., an Auto-Mode of operation). If the display system is not in Auto-Mode, then it is in the Scope mode, and the process proceeds to step 235 where the display system mode is changed to Scope mode of operation (FIG. 2A). If the display system is in Auto-Mode, then

TABLE 1

| LastName | # letters Last | First Name | # letters First | Last + First = | Output (Last, First) | Output Length | Full First Name in Comments |
|---|---|---|---|---|---|---|---|
| Abcdefghi | 9 | Michael | 7 | 16 | Abcdefghi, Michael | 18 | FALSE |
| Abcdefghij | 10 | Michael | 7 | 17 | Abcdefghij, Michael | 19 | FALSE |
| Abcdefghijk | 11 | Michael | 7 | 18 | Abcdefghijk, Michael | 20 | FALSE |
| Abcdefghijkl | 12 | Michael | 7 | 19 | Abcdefghijkl, Micha* | 20 | TRUE |
| Abcdefghijklm | 13 | Michael | 7 | 20 | Abcdefghijklm, Mich* | 20 | TRUE |
| Abcdefghijklmn | 14 | Michael | 7 | 21 | Abcdefghijklmn, Mic* | 20 | TRUE |
| Abcdefghijklmno | 15 | Michael | 7 | 22 | Abcdefghijklmno, Mi* | 20 | TRUE |
| Abcdefghijklmnop | 16 | Michael | 7 | 23 | Abcdefghijklmnop, M* | 20 | TRUE |
| Abcdefghijklmnopq | 17 | Michael | 7 | 24 | Abcdefghijklmnopq, * | 20 | TRUE |
| Abcdefghijklmnopqr | 18 | Michael | 7 | 25 | Abcdefghijklmnopqr,* | 20 | TRUE |
| Abcdefghijklmnopqrs | 19 | Michael | 7 | 26 | Abcdefghijklmnopqrs* | 20 | TRUE |
| Abcdefghijklmnopqrst | 20 | Michael | 7 | 27 | Abcdefghijklmnopqrs* | 20 | TRUE |
| Abcdefghijklmnopqrstu | 21 | Michael | 7 | 28 | Abcdefghijklmnopqrs* | 20 | TRUE |

It is understood that this Patient Name truncation is performed for purposes of display only and will not affect the stored patient information. If patient first name is truncated because of this limitation, the first name shall be displayed in the comment field 186 as shown in FIG. 4. The name on the comment field will be replaced when the first image is captured. For Patient Names (Last+First) less than 19 characters, the full name shall be displayed. The display will take the following form: the last name, a comma and space character, then the first name. Thus, for example: when an EW system Patient Name is: First Name: "Koichi", Last Name: "Hirose", the displayed Patient Name is "Hirose, Koichi". When the Patient Name (Last+First) is greater than or equal to 19 characters it is necessary to truncate the name. The entire last name will be displayed and the first name will be truncated with the minimum truncation possible. The truncation will take the form of the last name, a comma and a space character, then first part of the first name, then a "*" character.

Thus, as shown in FIG. 4, in an example display 175 presented on the RGB monitor with an EW Patient Name: First Name: "Michael, Last Name: "Pietromonaco"; the displayed Patient Name 182 is "Pietromonaco, Micha*".

In a further aspect of the invention, the EW system node 50 is able to quickly detect by receiving a command from the video processor device that the input image signals from the processor has changed to HD from SD or from SD to HD. In this manner, the signal switch at the video processor is activated. Thus for example, when the user switches from Scope Mode to Digital File (DF)mode, the video processor sends a notify command to EW system node, which it will reply to with a Remove Data command. When the user switches from Digital File mode to Scope mode, the video processor sends a notify command to EW system node, which it will reply to with a display overlay command.

FIG. 5 particularly depicts a flow chart depicting a process 200 implemented by the processing node 50 when changing between scope mode and "DF mode", and vice versa. For example, this process may be implemented at start up or, the process proceeds to step 210 where a determination is made as to whether the capture card at the EW node 50 can handle an HD image. In the newer implementations of the EW system, a system capture card at the EW node is configured for processing and (capturing) HD images. Thus, if the system capture card is configured for processing and (capturing) HD images, then the process proceeds to step 230 where the display system is placed in DF mode (FIG. 2B). However, if the system capture card is not configured for processing and (capturing) HD images (the capture card at the EW node is only capable of handling SD images), the process proceeds to step 215 where, a determination is made as to whether an HD scope is connected to the Video Processor. If an HD scope is connected to the Video Processor, then the process proceeds to step 220 where the display system operating mode is changed to Scope mode of operation. Returning back to step 215, if the connected scope is an SD scope, then the process proceeds to step 225, where the display system operating mode is changed to DF mode of operation.

The method of bypassing the Image Capture card and instead routing the HD signal directly to the Monitor via the processor's "Scope" mode requires a modification to the Capture Image Sequence rules. In current implementations, dummy information is passed to the processor during initialization and this information is removed by sending an appropriate command to the Video Processor. Further, the EW system uses the capture card to generate the overlay with the patient information. However, because the capture card is bypassed in the present invention, instead real information needs to be communicated to the video processor device (e.g., Olympus Medical Systems Corp. CV-180), which has the ability to generate its own overlay. If the user changes back and forth between Scope and Digital File modes, the software adapts to change the Capture Image Sequence rules and add/remove the hardware overlay in the manner as now described.

When in SCOPE mode, in order to not have the patient information overlay on the images captured to the PC, this information must be removed at some point before Image Capture. The method in which the system removes this overlay is configurable as a "Facility Setting" and it will apply to any video processor device (e.g., CV140, CV240 and CV160 as well as the CV-180). The three methods are: Overlay removed for the duration of the capture; Overlay removed when first image is captured; or, Overlay is not removed. A default setting is the "Overlay removed for the duration of the capture.

Figure 6:
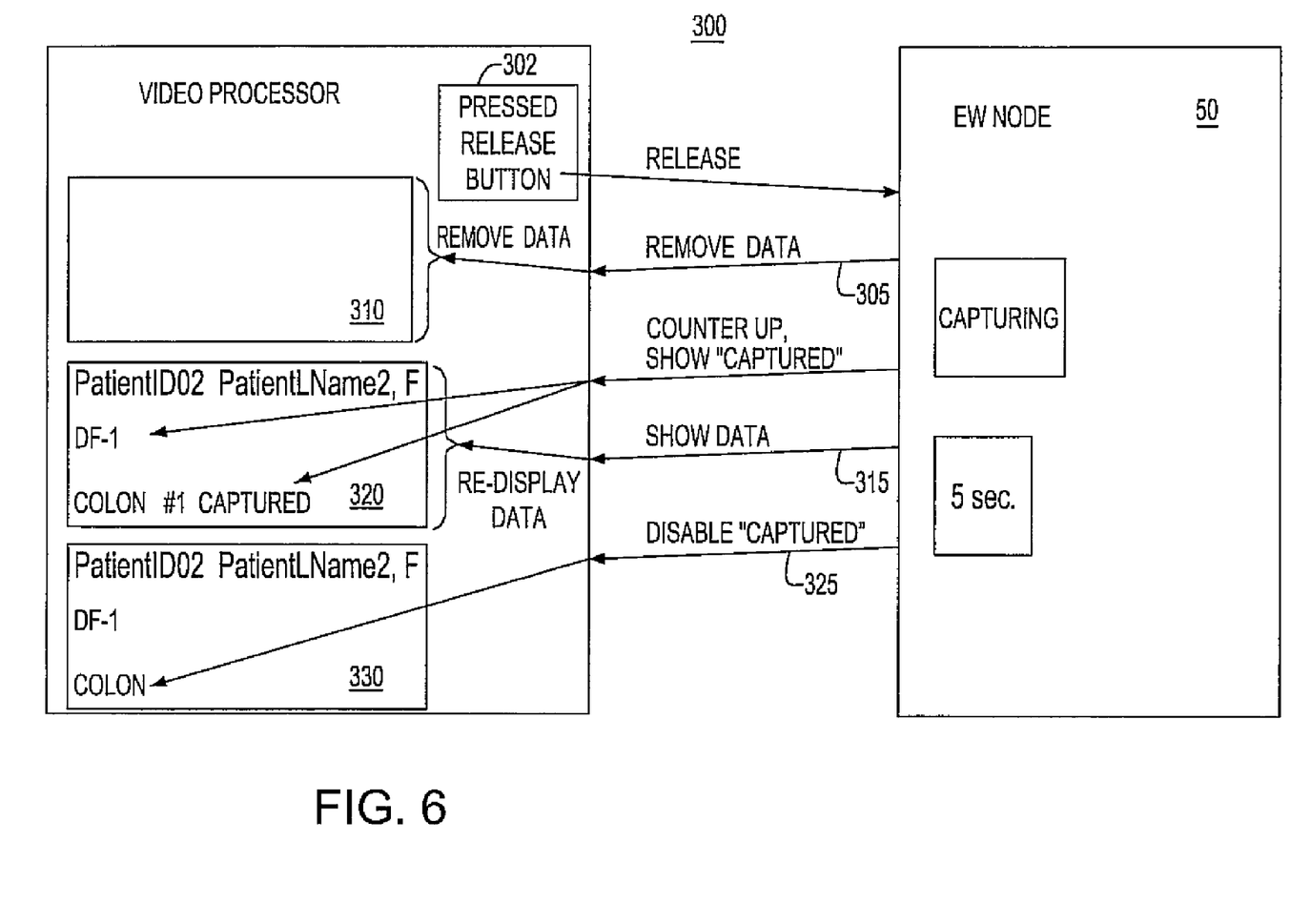
FIGS. 6-7 depict two respective overlay capture removal methods: 1) when the overlay data is removed for the duration of the capture (FIG. 6), and, 2) when the overlay data is permanently removed when first image/video is captured (FIG. 7); and, FIG. 8 depicts an exemplary overlay capture removal method whereby the overlay data is not removed.

With respect to a first method of removing an overlay for the duration of the image capture, as shown in a signal flow diagram 300 of FIG. 6, upon user selection of either the scope button 302 or the screen icon for image capture (not shown), the EW system will first generate a signal 305 for input to the video processor to instruct the CV Processor to remove the overlay. The result of this is shown in the exemplary screen display 310 shown in FIG. 6 that depicts the absence of any screen information. Then EW node's capture card will capture the image and finally return the overlay to the screen as depicted in the image 320 of the sequence which indicates that the image (e.g., image no. 1) has been captured. To accomplish this, the EW node generates signal 315 to cause re-display of the data including an indication that the desired image has been captured. The command sequence further provides for removal of the captured indication as depicted in the image 330 of the sequence. To accomplish this, the EW node generates signal 325 to cause re-display of the data without the "captured" indication.

Figure 7:
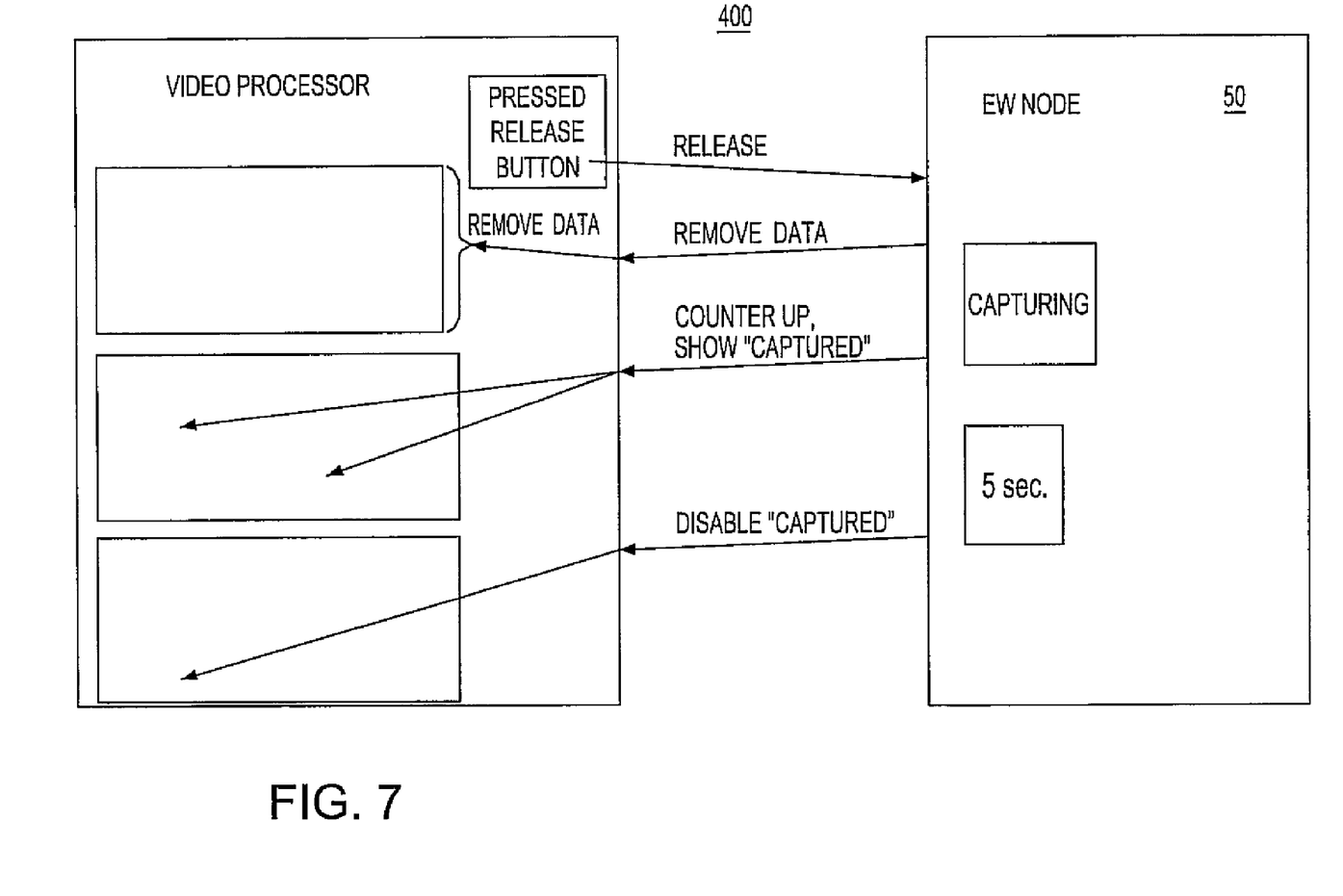

For the embodiment where the overlay is permanently removed upon Image Capture, upon user selection of this option, when either the scope button or the screen icon is pushed for image capture, the EW system node generates signals instructing the video processor to remove the overlay. This will cause the monitor screen to be clear of patient information. The signal command sequence 400 for this interaction is shown in the exemplary display sequence showing displayed screen shots in FIG. 7 without any overlay information provided. The user has the option of pressing the remove button on the keyboard to return the overlay to the screen.

Figure 8:
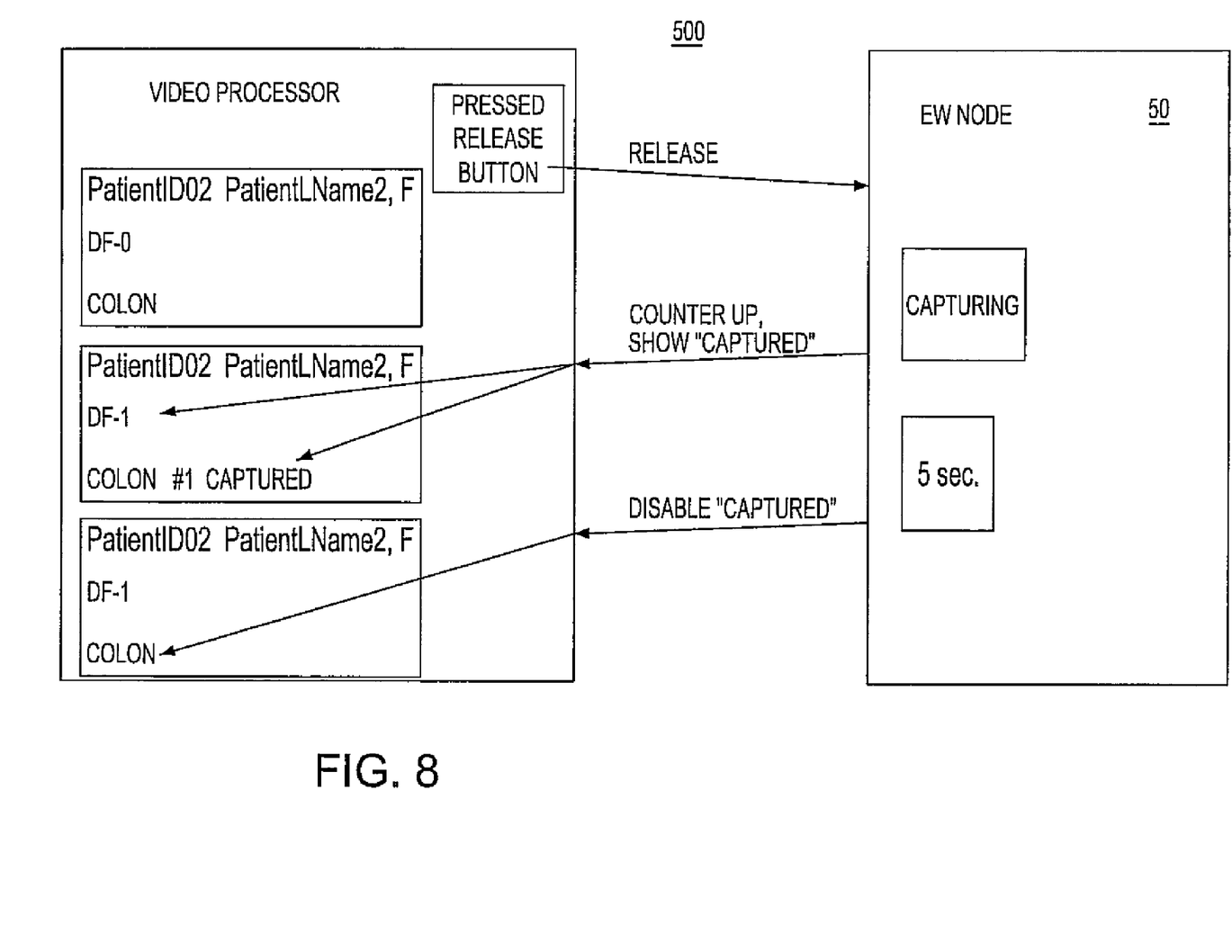

For the embodiment where the overlay is captured with Image, then if this is the user's selection, then the patient information overlay will be captured with Images Captured to the PC. The overlay is not removed from the screen unless performed by the user manually. The command sequence 500 for this interaction is listed in FIG. 8.

The invention is applicable for those EW endoscopy examination systems employing CV-** series of video processing devices, e.g., the Olympus CV-160 and -180 video processors and associated light sources. Types of endoscope devices configurable for use with the invention include, but are not limited to: the GIF-H180 gastroscope and CF-H180A/L wide-angle colonoscope, which, in addition to HDTV capabilities, also provides an unprecedented 170 degree field of view; and, other compatible standard definition scopes GIF-Q180 gastroscope, PCF-Q180 colonoscope, CF-Q180A wide angle colonoscope and GIF-N180 gastroscope products available from Olympus.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. An endoscopic image display apparatus comprising:
   a video processing device adapted for receiving image signals from an endoscope device having an imaging device for generating image signals of an object during an endoscopic examination,
   a first converting means for converting said image signals provided by a standard definition endoscope device into first resolution video image signals and converting said image signals provided by a high definition endoscope device into second higher resolution video image signals, depending on whether the standard definition endoscope device or the high definition endoscope device is attached;
   a second converting means for converting said second higher resolution video image signals converted and outputted by said first converting means into said first resolution video image signals;
   a processing node capable of receiving one of: said first resolution video image signals from said first converting means, or said first resolution video image signals from said second converting means, said processing node including image capture means adapted for capturing still images of said first resolution video image signals from said first converting means or said second converting means and, further routing back to said video processing device said first resolution video image signals from said processing node; and
   a switch means provided in said video processing device and configured for receiving said first resolution video image signals from said processing node and for routing said first resolution video image signals from said processing node to a first display device or, alternately, receiving one of said first resolution video image signals from said first converting means or said second higher resolution video image signals from said first converting means for routing respective said first resolution video image signals or second higher resolution video image signals to said first display device,
   said first display device coupled with said video processing device for real time viewing of said first resolution video image signals or second higher resolution video image signals from said first converting means or, said first resolution video image signals from said processing node, and said switch means switching source of endoscopic image signal such that said first resolution video image signals routed back from said second converting means are supplied to said first display device when the standard definition endoscope is attached, and said second higher resolution video image signals converted by said first converting means are supplied to said first display device when the high definition endoscope device is attached.

2. The apparatus as claimed in claim 1, wherein said video processing device includes said first converting means and said second converting means.

3. The apparatus as claimed in claim 1, further comprising a means for automatically configuring said switch means in a first operating mode for routing one of: said first resolution video image signals or, said second higher resolution video image signals from said first converting means to said first display device, or, for routing said first resolution video image signals from said processing node to said first display device in a second operating mode.

4. The apparatus as claimed in claim 3, wherein said second higher resolution video image signals from said first converting means are automatically routed to said first display device via said switch means when a high definition endoscope device is connected to said video processing device.

5. The apparatus as claimed in claim 3, wherein said first resolution video image signals from said first converting means are automatically routed to said first display device via said switch means when a standard definition endoscope device is connected to said video processing device.

6. The apparatus as claimed in claim 3, wherein said image capture means at said processing node is adapted for capturing first resolution video image signals from one of: said first converting means when a standard definition endoscope device is connected to said video processing device or, said second converting means when a high definition endoscope device is connected to said video processing device, wherein said switch means is configured for routing said first resolution video image signals from said processing node to said first display device.

7. The apparatus as claimed in claim 6, further comprising:
a communications link between said video processing device and said processing node for routing signals there between;
said video processing device further comprising: a means for receiving and storing data from said processing node via said communications link, said data representing information concerning a patient; and,
a means for overlaying said data information concerning a patient onto one of: said first resolution video image signals from said first converting means, or second higher resolution video image signals from said first converting means for display on said first display device.

8. The apparatus as claimed in claim 7, wherein said switching means is caused to switch to said second operating mode from said first operating mode, the video processing device:
sending a notify command signal to said processing node via said communication link that a standard definition scope is connected, and, in response,
said processing node transmitting signals to said video processing device via said communications link for instructing said video processing device to enter into said second mode of operation and to prevent overlaying said data information onto said first resolution image signals from said first converter device being displayed, wherein said switching of displayable image signals on said first display device is seamless to a user.

9. The apparatus as claimed in claim 7, wherein said switching means is caused to switch to said first operating mode from said second operating mode, the video processing device:
sending a notify command signal to said processing node via said communication link that a high definition scope is connected, and, in response,
said processing node transmitting signals to said video processing device via said communications link for instructing said video processing device to enter into said first operating mode and display overlaying data information to said second higher resolution signals for display at said first display device.

10. The apparatus as claimed in claim 9, wherein said video processing device is responsive to said transmitted signals for preventing display of said overlay information on the first resolution video image signals or second higher resolution video image signals from said first converting means when being captured at said processing node in said first operating mode.

11. The apparatus as claimed in claim 9, wherein said video processing device is responsive to said transmitted signals for turning off the display of said overlay information on the first resolution video image signals or second higher resolution video image signals from said first converting means before capturing a first image at said processing node in said first operating mode.

12. The apparatus as claimed in claim 9, wherein said video processing device is responsive to said transmitted signals for turning off the display of said overlay information on the first resolution video image signals or second higher resolution video image signals from said first converting means during capturing an image in said first operating mode.

13. A method for processing endoscopic image signals for a display device comprising the steps of:
providing a video processing device for receiving image signals from an endoscope device having an imaging device for generating image signals of an object during an endoscopic examination,
providing a first converting means for converting said image signals provided by a standard definition endoscope device into first resolution video image signals, or converting said image signals provided by a high definition endoscope device into second higher resolution video image signals, depending on whether the standard definition endoscope device or the high definition endoscope device is attached;
providing a second converting means for converting said second higher resolution video image signals converted and outputted by said first converting means into said first resolution video image signals;
providing an image capture means at a processing node for receiving one of: said first resolution video image signals from said first converting means, or said first resolution video image signals from said second converting means, said image capture means adapted for capturing still images of said first resolution video image signals from said first converting means or said second converting means and, further routing back to said video processing device said first resolution video image signals from said processing node;
providing a switch means in said video processing device that is configured for receiving said first resolution video image signals from said processing node and for routing said first resolution video image signals from said processing node to a first display device or, alternately, receiving one of said first resolution video image signals from said first converting means or said second higher resolution video image signals from said first converting means for routing respective said first resolution video image signals or second higher resolution video image signals to said first display device; and coupling said first display device with said video processing device for real time viewing of said first resolution video image signals or second higher resolution video image signals from said first converting means or, said first resolution video image signals from said processing node, and switching by said switching means source of endoscopic image output signal such that said first resolution video image signals routed back from said second converting means are supplied to said first display device when the standard definition endoscope device is attached, and said second higher resolution video image signals converted by said first converting means are supplied to said first display device when the high definition endoscope device is attached.

14. The method as claimed in claim 13, wherein said video processing device includes said first converting means and said second converting means.

15. The method as claimed in claim 13, further comprising: automatically configuring said switch means in a first operating mode for routing one of: said first resolution video image signals or, said second higher resolution video image signals from said first converting means to said first display device, or, configuring said switch means in a second operating mode for routing said first resolution video image signals from said processing node to said first display device.

16. The method as claimed in claim 15, further comprising: automatically routing said second higher resolution video image signals from said first converting means to said first display device via said switch means when a high definition endoscope device is connected to said video processing device.

17. The method as claimed in claim 15, further comprising: automatically routing said first resolution video image signals from said first converting means to said first display device via said switch means when a standard definition endoscope device is connected to said video processing device.

18. The method as claimed in claim 15, further comprising: capturing, by said image capture means at said processing node, said first resolution video image signals from one of: said first converting means when a standard definition endoscope device is connected to said video processing device or, said second converting means when a high definition endoscope device is connected to said video processing device, said switch means configured for routing said first resolution video image signals from said processing node to said first display device.

19. The method as claimed in claim 18, wherein a communications link is provided for routing signals between said video processing device and said processing node, said method further comprising:

receiving, by said video processing device, data from said processing node via said communications link, said data representing information concerning a patient; and, storing said received data representing information concerning a patient; and, overlaying said data information concerning a patient onto one of: said first resolution video image signals from said first converting means, or second higher resolution video image signals from said first converting means for display on said first display device.

20. The method as claimed in claim 19, further comprising: switching, by said switching means, to said second operating mode from said first operating mode, the video processing device:

sending a notify command signal to said processing node via said communication link that a standard definition scope is connected, and, in response, transmitting signals from said processing node to said video processing device via said communications link for instructing said video processing device to enter into said second mode of operation; and, preventing overlaying of said data information onto said first resolution image signals from said first converter device being displayed, wherein said switching of displayable image signals on said first display device is seamless to a user.

21. The method as claimed in claim 19, further comprising: switching, by said switching means, to said first operating mode from said second operating mode, the video processing device:

sending a notify command signal to said processing node via said communication link that a high definition scope is connected, and, in response, transmitting signals from said processing node to said video processing device via said communications link for instructing said video processing device to enter into said first operating mode; and displaying overlaying data information to said second higher resolution signals for display at said first display device.

22. The method as claimed in claim 21, further comprising: responding, by said video processing device, to said transmitted signals for preventing display of said overlay information on the first resolution video image signals or second higher resolution video image signals from said first converting means when being captured at said processing node in said first operating mode.

23. The method as claimed in claim 21, further comprising: responding, by said video processing device, to said transmitted signals for turning off the display of said overlay information on the first resolution video image signals or second higher resolution video image signals from said first converting means before capturing a first image at said processing node in said first operating mode.

24. The method as claimed in claim 21, further comprising: responding, by said video processing device, to said transmitted signals for turning off the display of said overlay information on the first resolution video image signals or second higher resolution video image signals from said first converting means during capturing an image in said first operating mode.

25. A non-transitory program storage device readable by a machine, tangibly embodying a program of instructions executable by the machine to perform method steps for processing endoscopic image signals for a display device, said method comprising the steps of:

providing a video processing device for receiving image signals from an endoscope device having an imaging device for generating image signals of an object during an endoscopic examination;

providing a first converting means for converting said image signals provided by a standard definition endoscope device into first resolution video image signals, or converting said image signals provided by a high definition endoscope device into second higher resolution video image signals, depending on whether the standard definition endoscope device or the high definition endoscope device is attached;

providing a second converting means for converting said second higher resolution video image signals converted and outputted by said first converting means into said first resolution video image signals;

providing an image capture means at a processing node capable of receiving one of: said first resolution video image signals from said first converting means, or said first resolution video image signals from said second converting means, said image capture means adapted for capturing still images of said first resolution video image signals from said first converting means or said second converting means and, further routing back to said video processing device said first resolution video image signals from said processing node;

providing a switch means in said video processing device that is configured for receiving said first resolution video image signals from said processing node and for routing said first resolution video image signals from said processing node to a first display device or, alternately, receiving one of said first resolution video image signals from said first converting means or said second higher resolution video image signals from said first converting means for routing respective said first resolution video image signals or second higher resolution video image signals to said first display device;

coupling said first display device with said video processing device for real time viewing of said first resolution video image signals or second higher resolution video image signals from said first converting means or, said first resolution video image signals from said processing node, and switching by said switching means source of endoscopic image output signal such that said first resolution video image signals routed back from said second converting means are supplied to said first display device when the standard definition endoscope device is attached, and said second higher resolution video image signals converted by said first converting means are supplied to said first display device when the high definition endoscope device is attached.

* * * * *